(12) United States Patent
    Kato et al.

(10) Patent No.: US 10,572,860 B2
(45) Date of Patent: Feb. 25, 2020

(54) PRODUCT PROVIDED WITH MANAGEMENT INFORMATION

(71) Applicant: TECHNO QUARTZ INC., Tokyo (JP)

(72) Inventors: Masahide Kato, Yamagata (JP); Yasuhiro Umetsu, Yamagata (JP)

(73) Assignee: TECHNO QUARTZ INC., Tokyo (JP)

( * ) Notice: Subject to any disclaimer, the term of this patent is extended or adjusted under 35 U.S.C. 154(b) by 368 days.

(21) Appl. No.: 15/531,364

(22) PCT Filed: Nov. 26, 2015

(86) PCT No.: PCT/JP2015/083249
    § 371 (c)(1),
    (2) Date: Jul. 27, 2017

(87) PCT Pub. No.: WO2016/084902
    PCT Pub. Date: Jun. 2, 2016

(65) Prior Publication Data
    US 2017/0330156 A1    Nov. 16, 2017

(30) Foreign Application Priority Data

Nov. 27, 2014 (JP) .................................. 2014-240643

(51) Int. Cl.
    *G06Q 10/00*    (2012.01)
    *B23K 26/53*    (2014.01)
    (Continued)

(52) U.S. Cl.
    CPC ......... *G06Q 10/20* (2013.01); *B23K 26/0006* (2013.01); *B23K 26/0622* (2015.10);
    (Continued)

(58) Field of Classification Search
    CPC ................ G06Q 10/20; B23K 26/0622; B23K 26/0006; B23K 26/53; B23K 2101/40;
    (Continued)

(56) References Cited

U.S. PATENT DOCUMENTS

| | | | |
|---|---|---|---|
| 6,605,797 B1* | 8/2003 | Troitski ............. | B23K 26/0604 219/121.69 |
| 6,686,694 B2* | 2/2004 | Rechermann .......... | B41M 5/262 313/633 |
| 2017/0008798 A1* | 1/2017 | Mimoun ................ | B41M 5/262 |

FOREIGN PATENT DOCUMENTS

| JP | H04-071792 A | 3/1992 |
|---|---|---|
| JP | H04-110944 A | 4/1992 |

(Continued)

OTHER PUBLICATIONS

Kawashima, Haya to et al., Invisible two-dimensional bar code fabrication inside a synthetic fused silica by femtosecond laser processing using a computer-generated hologram, Proc. SPIE 7 925, Frontiers in Ultrafast Optics: Biomedical, Scientific, and Industrial Applications XI, 79251C [online], Feb. 11, 2011, [retrieved on Dec. 10, 2015], Retrieved from the Internet:<URL:http://spie.org/Publications/ Proceedings/Paper/10.1117/12.876087>.

(Continued)

*Primary Examiner* — Seung H Lee

(74) *Attorney, Agent, or Firm* — Lucas & Mercanti, LLP

(57) ABSTRACT

A transparent product can reliably transmit management information, and even under a harsh environment, the indicated management information will not be peeled off. The transparent product includes management information for managing the product. The management information is provided inside the product so that the management information can be visually recognized through at least one surface of the product in the thickness direction.

7 Claims, 6 Drawing Sheets

(51) Int. Cl.

| | |
|---|---|
| *G06K 19/06* | (2006.01) |
| *B23K 26/00* | (2014.01) |
| *B23K 26/0622* | (2014.01) |
| *B41M 5/24* | (2006.01) |
| *G05B 19/402* | (2006.01) |
| *B23K 103/00* | (2006.01) |
| *B23K 101/40* | (2006.01) |
| *G05B 19/12* | (2006.01) |
| *G06K 7/14* | (2006.01) |

(52) U.S. Cl.
CPC ............... *B23K 26/53* (2015.10); *B41M 5/24* (2013.01); *G05B 19/402* (2013.01); *G06K 19/06046* (2013.01); *B23K 2101/40* (2018.08); *B23K 2103/54* (2018.08); *G05B 19/124* (2013.01); *G05B 2219/23363* (2013.01); *G05B 2219/40538* (2013.01); *G05B 2219/40623* (2013.01); *G06K 7/1417* (2013.01); *G06K 19/06037* (2013.01); *Y02P 90/14* (2015.11)

(58) Field of Classification Search
CPC ................ B23K 2103/54; B41M 5/24; G06K 19/06037; G06K 19/06046; G06K 7/1417; G05B 2219/40538; G05B 2219/40623; G05B 19/402; G05B 19/124; G05B 2219/23363; Y02P 90/14
See application file for complete search history.

(56) References Cited

FOREIGN PATENT DOCUMENTS

| | | |
|---|---|---|
| JP | H11-138896 A | 5/1999 |
| JP | 3095312 B2 | 10/2000 |
| JP | 2001-080297 A | 3/2001 |
| JP | 2005-063095 A | 3/2005 |
| JP | 2005-063143 A | 3/2005 |
| JP | 2005-165659 A | 6/2005 |
| JP | 2011-141579 A | 7/2011 |
| JP | 2014-71466 A | 4/2014 |
| WO | 2005/121048 A1 | 12/2005 |

OTHER PUBLICATIONS

Written Opinion of the International Search Authority for PCT/JP2015/083249 dated Dec. 22, 2015.
Notification of Reasons for Refusal for Japanese Patent Application No. 2016561946 dated Jul. 10, 2018.

* cited by examiner (A)               (B)

PRODUCT PROVIDED WITH MANAGEMENT INFORMATION

FIELD OF THE INVENTION

The invention relates to a product provided with management information, in particular, to a product provided with management information, wherein said management information is certainly visible without any loss of said management information indicated even after the use under a harsh environment.

BACKGROUND

Conventionally, management has been carried out by indicating management information including quality data of parts or materials used for the production of a product, production conditions, the maintenance period, inspection data obtained by inspecting the product, the date of manufacture, or the manufacturer in order to perform quality management of the product or member. The management information is indicated as text information as it is, or coded to indicate on the product or member. Therefore, it has been required to provide management information such as text or code of the date of manufacture or the manufacturer in order to perform quality management of the product or member.

Furthermore, when providing the management information to the product, in general, the management information is stamped, or printed, or a sheet indicating the management information is adhered on the surface of the product. Various processing methods have been used to indicate the management information by subjecting the product to a surface processing. For example, various processing methods, such as laser processing, sandblast processing, chemical etching process, as well as, hand-carving process using cutting tools, etc., have been used.

The traceability of the produced product has been managed by manually or mechanically reading out the management information indicated on the surface of the product.

In the prior art, various techniques for the management of production history information of the product or member by reading out management information provided to the product or member have been proposed.

DESCRIPTION OF THE RELATED ART

For example, Patent Document 1 (JP2005-165659A) proposes a member information management method which allows the reliability of member information to be secured for a tong term, and an access to the member information and its addition/update to be easily performed over the entire life cycle of the member. This member information management method is a method for managing the history information of the member by directly applying the information relating to said member to said member, in which a two-dimensional code is directly marked onto said member by laser marking.

Moreover, Patent Document 2 (JP2005-063095A) proposes a traceability management method which can easily access production history information of individual parts constituting a product, and which can effectively avoid producing defective products by reflecting it to the production process of the product. In this traceability management method, the size of a two-dimensional coded two-dimensional code is set depending on parts, and a laser marking process directly laser-marks the two-dimensional code of the set size to the parts by a laser marker to produce a product.

PRIOR ART DOCUMENT

Patent Literature

Patent Document 1: Japanese Patent Publication No. 2005165659
Patent Document 2: Japanese Patent Publication No. 2005-063095

SUMMARY OF THE INVENTION

Problems to be Solved by the Invention

As previously disclosed, various methods for the management of various information and traceability of a product or member by indicating management information on the product or member, and by reading out said management information in the prior art. However, in many cases, said management information has been provided on the surface of the product or member.

Meanwhile, there are several products which are to be used under a harsh environment, for example, in an atmosphere of corrosive gas, or under a high temperature environment near 1000° C. There was a problem that in the products used under such a harsh environment, the management information indicated on the surface of the product can be peeled off, or consumed and degraded to be blurred. Once the indicated management information was peeled off (or blurred), the management information of the product of interest could not be confirmed, and thereafter, the quality management during the use of the product could not be carried out.

Furthermore, as one management method of a product, there is a method where an IC chip is embedded inside the product. However, when the product is used under the above-mentioned high temperature environment, or an environment where the product is exposed to micro waves, there is a problem that the IC chip malfunctions or is broken.

Therefore, in the invention, it is a first object to provide a product to which management information is provided to allow the management information to remain present for a long term while the indicated management information is not peeled off (or blurred) even though the product is used under the harsh environment (production or use conditions).

Furthermore, in the production process of a semiconductor device, fine dust (particles) may affect the quality of the device. Therefore, it has been desired to build a production apparatus used in the production process with members which generate fine particles as little as possible. On the other hand, when the management information is printed on the surface of the product, it is considered that a printed film is peeled off, and becomes a source of pollution. Furthermore, it is also considered that when the management information is applied by mechanically processing the surface of the product, due to the process crack (or process damage) exposed on the surface, fine dust (particles) are generated as contaminants.

Therefore, it is a second object in the invention to provide a product to which the management information is provided such that fine dust (particles) which is a factor of contamination and another failure is not generated during the production process of electronic devices such as semiconductor devices, or another product.

Furthermore, the products to which the management information is provided have been comprised by various materials in various shapes. Due to this, it has been necessary to attempt to modify the way to configure the management information depending on the material or shape of the product. For example, there is a product comprised of a material or having a shape with which the management information cannot easily be directly indicated. In such a case, it is necessary to indicate the management information by separately providing tags, sticky notes, etc. When the product is provided with tags or sticky notes, it is concerned that said tags or the like become obstacles during the distribution or use of said product and inhibit the portability of the product.

Therefore, in the invention, it is a third object to provide a product to which the management information is provided so as not to inhibit the portability of the product.

Means for Solving the Problems

In order to solve at least one of the previously mentioned problems, the invention provides a product to which management information is provided inside surfaces having a thickness of the product (for example, any wall surfaces such as an upper surface, a side surface, and/or a bottom surface), in which said information is transmissive through the surface(s) of the product.

In other words, the invention provides a product provided with management information for managing the product, characterized in that said management information is provided at a site where the product has a thickness, and the inside thereof in the thickness direction, in which said management information can be visually recognized through at least one of the surfaces of said product in the thickness direction.

According to the product provided with the management information according to the invention, there is no concern that the indication of the management information is peeled off, or deteriorated by wear to run out, since the management information for managing the maintenance period and the like of the product is provided inside the surface having a thickness such as a wall surface (that is, the inside in the thickness direction). Therefore, the management information of the product according to the invention can remain, even when the product is used under a harsh environment. Moreover, since the management information is provided inside the wall surface in its thickness direction, a fear of generating fine dust (particles) can be eliminated, and therefore, the product can be used in a production process where there is a high risk that such fine dust affects the quality of the product. That is, because of these effects, the product according to the invention can provide an excellent effect in components (products) of a producing apparatus used in the semiconductor device production.

In the previously disclosed product provided with the management information according to the invention, it is necessary to form the management information indicated inside a site such as a wall surface such that said information is permeably visually recognized through any one of the surfaces existing in the thickness direction. Thus, it is necessary to form at least one of surfaces existing in the thickness direction so as to be transparent or translucent.

When both sides of the portion in the thickness direction where the management information is provided (the site having a thickness) are formed to be transparent, the whole of said portion may be formed by a transparent or translucent material. More specifically, the whole of said portion or the product can be formed by a transparent material such as glass, resin, ceramics, etc. Said transparent material may be formed either from a natural material, or by chemical synthesis.

In a semiconductor device producing apparatus, quartz glass products are also used. The quartz glass products may be formed by using a transparent material, or processed to partially have a low light permeable, frosted glass surface according to intended use of the product. For this, in the product provided with the management information according to the invention, both cases where the surface condition thereof has a transparent finish as a whole, and where said condition partially has a low light permeable rough surface (satin finish) finish are presumed.

Furthermore, for the portion where the management information is provided (a surface having a thickness), since it is sufficient that at least one of the surfaces present in the thickness direction is transparent, any one of the other surfaces may be translucent or opaque. Therefore, provided that the management information can be visually recognized from any one of the surfaces in the thickness direction, "the portion having a thickness" where said management information is provided may be partially frosted glass processed to provide a low light permeability, or may be formed by a transparent material, and then one surface thereof may be coated with a light impermeable material to be opaque. This is because the management information is provided inside the portion having a thickness in the product so that it is only necessary to reliably recognize and transmit the management information from any one of the surfaces in the product according to the invention. However, when the management information is formed by ablation processing with laser light to be described later, it is desirable that a surface opposite to the surface through which the management information is recognized by transmission is other than white. This is because the management information can easily be read out, since when glass or the like is subjected to ablation processing with laser light or the like, the management information is indicated in white.

The management information refers to information for managing products such as identification information identifying the product from other companies' products (for example, company name, logo, symbols, etc.) and the model number, or the standards, as well as, the maintenance period, the date of manufacture, the manufacturer, etc. of the product. The management information can be indicated (given) in various forms. More specifically, the manufacturer name, the seller's name, the date of manufacture, the product code, etc., can be indicated by text information such as letters and numbers, as well as, by one-dimensional bar code such as JAN, CODE 39, or NW-7, or by two-dimensional code such as a QR code that can accommodate more information (registered trademark, the same below), a data matrix code, or PDF417, or as other information including symbols including letters and numbers, figures, mosaics, etc. In order to indicate the management information in the product, the shape of the management information can be appropriately selected and used depending on the material and the shape of the product to be an object. For example, when a product (in particular, a portion having a thickness in the product) is formed in a small diameter cylindrical shape or the like, it is possible to reliably display necessary management information by forming the management information to be indicated with a two-dimensional code such as a QR code having a small size, or by indicating one-dimensional barcodes along the axial direction (length direction).

The management information is provided inside the portion having a thickness in the product so as to be permeable through at least one of the surfaces in the thickness direction. Such management information can be formed by, for example, ablation processing in which a laser light is emitted with a focal point set inside the product, and the inside of the product is subjected to sublimation and evaporation. Specifically, micro unevenness (cracks or the like) is formed inside by ablation (explosion) with the laser light, so that it becomes opaque so as to become management information and it is formed so as to be visually recognizable.

Furthermore, the above management information can be identified by a difference in reflectance of light. Accordingly, in addition to indicating the information in an opaque manner, it is also possible to indicate it by making the portion to indicate the information transparent and making the margin opaque. At that time, it is also possible to provide both management information in which the information indicating portion is made opaque and management information in which the margin is made opaque. Especially when the management information is a coded mosaic, it is desirable to indicate the management information by making it opaque so as to reduce the transparent portion when coded. When forming the micro unevenness (cracks or the like) in the management information by ablation with laser light, the micro unevenness may be any of a configuration in which dots are arranged, a configuration in which line hatchings are crossed, or a combination of dots and lines. In particular, as compared with the arrangement wherein dots are simply arranged, it is possible to improve visibility by visual observation or by using a scanner when the arranged dots are surrounded by lines.

As a laser oscillator used in the ablation processing, solid lasers, fiber lasers and the like can be appropriately selected and used depending on the object to be processed (processing diameter, processing depth, etc.) and processing conditions (wavelength, output, pulse width, oscillation mode, etc.). That is, in order to form micro unevenness (cracks or the like) inside the product, the relationship between the product surface and the energy density of the internal focal point becomes important. Specifically, the energy density at the surface of the product when laser light is emitted is set to be equal to or less than the breakdown threshold value, and the energy density at the portion indicating the management information (the point at which the laser light is focused) is necessary to set to be equal to or more than the breakdown threshold value. By setting the conditions as described above, it is possible to cause melting, deterioration, etc. in the inside without damaging the product surface. As a result, since the refractive index, the reflectance and the like of the portion which is deteriorated or else inside the transparent product are different from the other portions, the information can be recognized from the outside, and can function as a mark as management information and the like. In consideration of the above, in the invention, it is desirable to use a YAG pulse laser which can apply microfabrication while suppressing thermal influence.

In order to apply the ablation processing to the inside of the product, it is desirable that at least one of the surfaces in the thickness direction in the region provided with the management information is formed to be transparent and smooth. Specifically, it is desirable that at least the laser beam incident side is formed to be transparent and smooth. This is because when the laser ablation process is carried out, this makes focusing the laser light on the inside of the transparent product easy. It is also desirable in that the accuracy of reading is improved when acquiring (reading) the information with an optical reader. There is no particular limitation on the processing method of forming any one of the surfaces of the product to be transparent and smooth, and it is possible to use any techniques such as polishing by mechanical processing, or flame treatment. However, it is desirable to perform the processing by a method in which scratches, processed abrasive grains and the like which may cause dust generation remain on the surfaces of the transparent product as little as possible.

Furthermore, in the product according to the invention, it is desirable to provide a distinguishing indication for discriminating at least one of the front side, the back side, and the reversal of the management information when the management information is indicated. Such a distinguishing indication is desirably provided together with the management information. Such a distinguishing indication can be provided to reliably carry out the acquisition operation when acquiring (reading) the indicated management information. That is, since the produced transparent product can be rotated or left-right reversed during the manufacturing process or use thereof, the possibility that the management information always points in the same direction is low. For example, in a state in which the coded management information is reversed upside down or leftwards and rightwards, or reversed on the front and back sides, even if it is attempted to acquire (read) the information with a commercially available code reader or the like, there may be a possibility that the information cannot be read. Therefore, a distinguishing indication is provided, whereby the regular position of the management information can be reliably recognized, and the management information can be read accurately from the front in the correct orientation. There is no particular restriction on the indication method of the distinguishing indication, and for example, symbols such as straight lines may be provided on the upper or lower part of the management information such that the upward direction or the downward direction of the management information can be discriminated, or a bracket may be provided only on the upper left side such that the front side and the back side can also be recognized. Furthermore, it is also possible to provide letters (for example, company name, etc.) or numbers which are asymmetrical in left and right. However, there is one condition that the distinguishing indication should be provided in a shape that does not disturb the information acquisition (reading) operation of the reading device.

As a method for forming the management information inside in the thickness direction of the transparent product, besides the laser processing as described above, it can be formed by stacking. For example, it is also possible that two members, at least one of which indicates (is given) the management information, are superimposed to combine each other by adhering such that the indication portion of the management information is covered. One of the members is made to be a transparent plate with a surface polished, on the surface thereof is formed the management information by sandblasting, laser processing or the like, and a polished transparent plate or the like is applied to the other member, and then these two are bonded by diffusion bonding or welding etc., to form the product. In other words, when it is difficult to form the information inside of the product by laser processing (it is difficult to set processing conditions) due to, for example, a thin product, by using the method of forming the management information by the above-mentioned bonding, it is possible to shorten the processing time, and it is also possible to minimize the possibility of occurrence of scratches or the like on the surface as much as possible.

By visually recognizing or reading the management information formed inside the product as described above, it is possible to manage the product such as maintenance based on the management information. When the management information is directly indicated by characters, it can be acquired by reading the characters, while when the information is indicated as a coded symbol or mosaic, the information is acquired (read) by using a reader such as a commercially available code reader. That is, the information acquisition (reading) includes reading characters, reading codes, and the like.

In addition, the operation of acquiring (reading) the information may be carried out by operating the reading device while holding it by hand, or placing it on a desk. In the latter case, it is desirable to operate on a desk (base) where the face pattern is a single color. This is because when the desktop (base) is formed to be uneven, or a plurality of patterns is applied thereon, it may become difficult for the optical reader to read the management information of the transparent product due to the effect of the desktop (base).

In addition, in the product produced according to the above, the management information is accurately indicated (given) inside the portion having a thickness. Therefore, there is extremely less possibility that the management information is peeled off or blurred. Also, since no processing crack is formed on the surfaces of the product, even if it is used in a harsh environment, it is possible to reduce the possibility of dust generation and contamination as much as possible.

Furthermore, since the management information is provided inside the product by the ablation processing using the laser light, even if the product is frosted glass finished product, the management information can be reliably formed. That is, by reading the management information provided inside the product, it is possible to acquire the information such as the maintenance period, the date of manufacture, and the manufacturer of the product, allowing accurate product (member) management.

Effect of the Invention

In the product according to the invention, the management information is accurately indicated (given) inside the portion having a thickness. Therefore, even if manufactured or used under severe conditions, the indicated management information is not peeled off (or blurred), and thus the management information can be reliably transmitted.

Furthermore, when forming the management information, since processing cracks (or processing damage) that can cause fine dust (particles) are formed so as not to be exposed on the surfaces, problems such as dust generation and contamination caused by the processing cracks can be solved. Therefore, it can be used particularly effectively when used in a clean environment such as a semiconductor device manufacturing process.

Furthermore, when the management information is indicated inside the product using the laser light, even if the transparency of the surface is low, the management information can be accurately recognized. Therefore, it is possible to distribute and use the products without using other members such as tags and sticky notes, and it is possible to provide a product that does not disturb the portability of the product.

In addition, since accurate product (member) management of the transparent product can be performed based on the indicated accurate management information, it is possible to find manufacturing merits such as shortening the time for product management operations and prevention of outflow of defective products.

DETAILED DESCRIPTION OF THE INVENTION

Best Mode for Carrying Out the Invention

A product provided with management information and a manufacturing method of the product according to the embodiments of the invention will be specifically described with reference to the drawings below. However, the product provided with the management information according to the invention is not limited to the embodiments of the invention, and can be appropriately modified without departing from the scope of the invention.

FIG. 1(A) shows a product C1 provided with management information 10 according to a first embodiment. By ablation processing with laser light L, inside the product C1 formed of a transparent material, a QR code to be the management information 10 is formed.

FIG. 1(B) shows the principle of ablation processing by laser light. In this embodiment, the management information is formed by incidence of the laser light L to the surface (laser light incident surface) 11 of the transparently formed product C1. The laser light L is focused to a focal point P apart from the product surface (laser light incident surface) 11 by a distance of $Z_1$ via the condenser lens 13. Since the energy density at the focal point P is set to be equal to or higher than the breakdown threshold inside the product, melting, deterioration, and the like occur in the region near the focal point P. The refractive index, the reflectance, and the like of the portion where the deterioration or the like has occurred are different from the other portions, so that the portion can be distinguished from the outside. That is, according to the above processing principle, the management information 10 can be formed inside the transparent product C1. In the surface (laser light incident surface) of the transparently formed product C1, the laser light L is set to be equal to or lower than the breakdown threshold value, so that fine unevenness (cracks or the like) never occurs on the surface.

Figure 2:
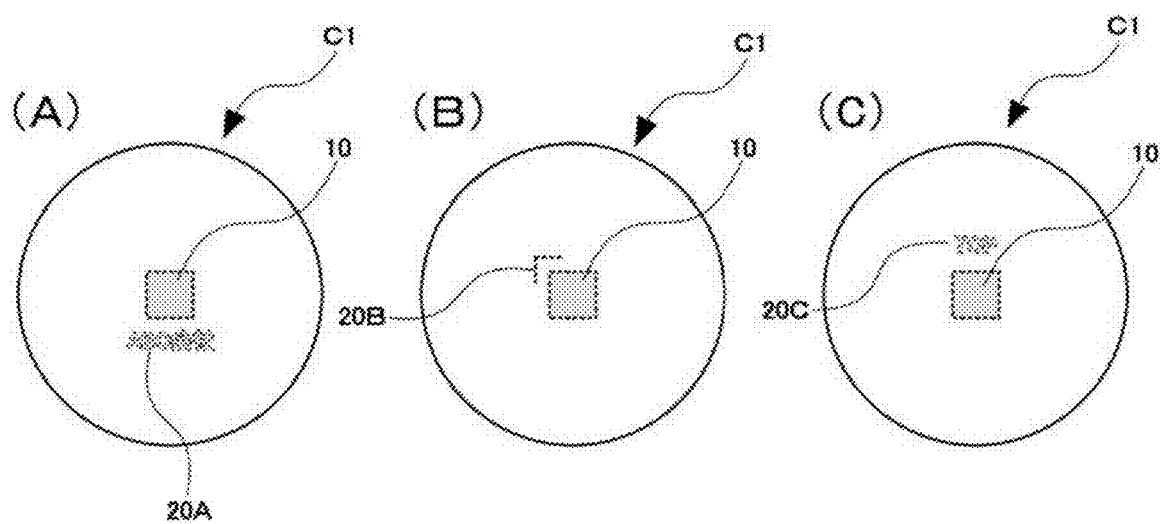
FIG. 2 shows plan views of products provided with a distinguishing indication for discriminating at least one of the front side, back side and reversal of the management information, showing several examples for distinguishing indications: (A) a plan view of a product with a distinguishing indication using a company name; (B) a plan view of a product with a distinguishing indication using brackets; and (C) a plan view of a product with a distinguishing indication using the characters "TOP" indicating the upward direction.

Furthermore, as shown in FIG. 2, it is desirable to provide a distinguishing indication for discriminating at least one of the front side, the back side and the reversal of the management information 10 in the transparent product C1. This is to make the acquisition operation accurate and reliable when acquiring (reading) the indicated management information 10. In this distinguishing indication, for example, as shown in FIG. 2(A), the company name "ABC company" can be displayed at the bottom of the management information 10, being the distinguishing indication 20A, or as shown in FIG. 2(B), the bracket can be provided to interpose to the upper left part of the management information 10, being the distinguishing indication 20B, or as shown in FIG. 2(C), the characters "TOP" indicating the upward direction can be indicated at the upper portion of the management information 10, being distinguishing indication 20C. This distinguishing indication is not limited to the above examples, and it can be provided in various shapes at various positions provided that the acquisition (reading) operation of the information in the reading device is not hindered. By providing such a distinguishing indication, it is possible to recognize the right position of the management information 10, and to read the management information 10 accurately from the front surface.

EXAMPLES

Example 1

Figure 1:
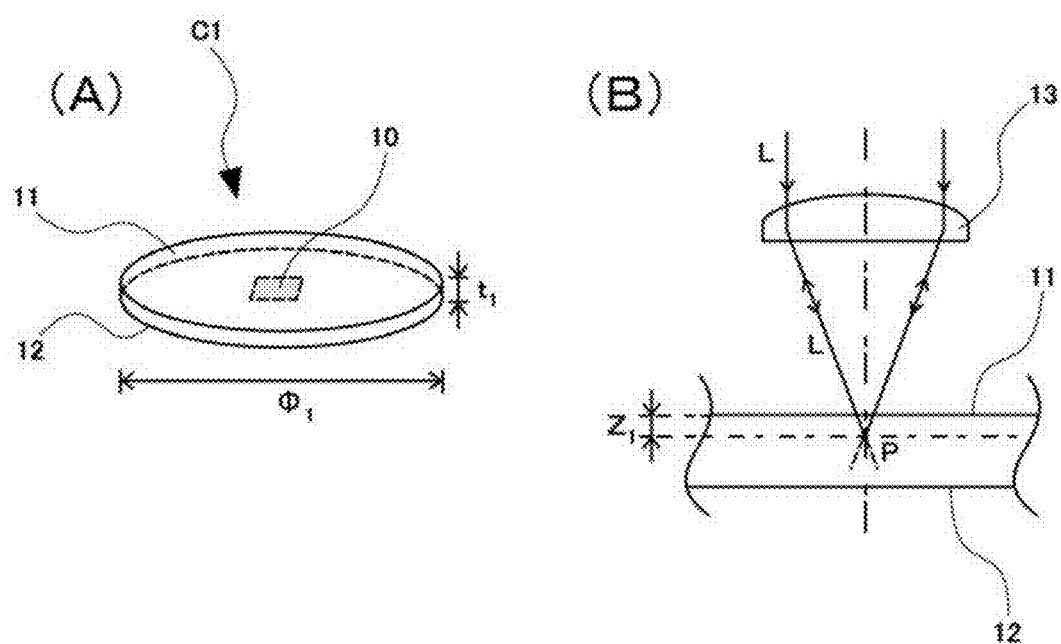
FIG. 1 shows a product provided with management information according to a first embodiment: (A) a perspective view of the product; and (B) a cross-sectional view of essential parts showing the principle of ablation processing by laser light.

In Example 1, as shown in FIG. 1, it was confirmed by ablation processing with the laser light L whether or not the management information can be actually processed, and whether or not the processed management information can be read out.

In this Example 1, firstly, transparent products each made of two different materials, synthetic quartz glass (AQ manufactured by Asahi Glass Co., Ltd.) and natural fused quartz glass (GE 124 manufactured by Momentive) were used as a transparent material product. These two different kinds of transparent products were formed into a circular plate having an outer diameter $\phi_1$ of 50 mm, and a plate thickness $t_1$ of 1 mm, both having a surface (laser light incident surface) 11, and a smooth and transparent back surface 12 and were used. In laser processing thereof, a YAG pulse laser having a wavelength range of 1064 nm to 355 nm was used as a light source, and the processing output was set to 1.5 W.

Here, in the this example, the reason why the laser processing output is set to 1.5 W is that the management information can be visually recognized, and the processing conditions that can be reliably read out can be confirmed in advance. That is, prior to the example, ablation processing is performed separately for each laser processing output to verify the visibility (whether visual recognition of a figure can be recognized) of the management information formed inside the product, and readability or not, and the results thereof were reflected.

Specifically, in this verification, as a transparent product, the synthetic quartz glass (AQ manufactured by Asahi Glass Co., Ltd.) formed with a flat plate having an outer diameter $\phi_1$ of 50 mm and a plate thickness $t_1$ of 1 mm was used, and the laser output conditions were changed to form the management information, and then it was verified whether or not the formed management information can be visually checked and whether the information can be read out from the formed QR code by using a commercially available handy type code reader (manufactured by Keyence/model BT-75W). The management information was formed as a square shaped QR code having 13 mm length of one side, at a depth of about 0.1 mm from the product surface. Table 1 below shows the verification results.

TABLE 1

Internal markings when laser output conditions are different

| No. | Laser Output Conditions | Visibility | Readability |
|---|---|---|---|
| 1 | 0.8 W | × | × |
| 2 | 0.9 W | ○ | ○ |
| 3 | 1.0 W | ○ | ○ |
| 4 | 1.5 W | ○ | ○ |

Visibility:
○ indicates that a figure can be visually checked.
× indicates that a figure cannot be visually checked.

In this verification, as shown in Table 1, it was confirmed that the management information cannot be visually recognized when the laser processing output is 0.8 W, and the visibility and readability are allowable at the processing output of 0.9 W or more. Therefore, in the example, the laser processing output is set to 1.5 W or above, which provides reliably visibility and readability.

From the above verification results, in Example 1, the laser processing output was set to 1.5 W, and a square shaped QR code with a side of 13 mm was formed for said two different kinds of materials at a depth of about 0.1 mm from the surface of the product, and it was verified whether or not the materials can actually be processed, and further whether or not the information can be read out from the formed QR code with a commercially available handy type code reader (manufactured by Keyence/model BT-75W), even after the product having the QR code formed was put into an atmospheric furnace at a high temperature of 1150° C. for 60 minutes.

The results are shown in Table 2 below. That is, the following Table 2 shows experimental results as to the possibility of the laser processing relating to the materials of the two different kinds for the transparent products, and whether the information can be read out by the reading device.

TABLE 2

Internal laser marking/QR code to quartz glass
(double-sided transparent finish) plate

| No. | Material | Laser Processing Output | Process-ability | Read-ability |
|---|---|---|---|---|
| 1 | Synthetic quartz glass (AQ manufactured by Asahi Glass Co., Ltd.) | 1.5 W | ○ | ○ |
| 2 | Natural fused quartz glass (GE 124 manufactured by Momentive) | 1.5 W | ○ | ○ |

As shown in Table 2, it was confirmed that, for transparent products formed with two different materials, it is possible to form the management information (QR code in this example) inside the product for either products, and the formed management information can be read out. That is, it was confirmed that the information can be formed internally and readably for materials (material) made by either natural raw material or chemical synthesis.

Furthermore, it was verified whether the transparent products in which the management information was formed can be used even under a harsh environment. Specifically, the above two different kinds of transparent products having the management information formed were introduced into an atmospheric furnace at a high temperature of 1150° C. for 60 minutes, and the availability of the products was confirmed. As a result, it was confirmed that the management information formed inside the product never peels off (or is blurred) and does not disappear even after it is put into a high temperature atmospheric furnace, and the information also can be read out by the code reader.

Example 2

In Example 2, the laser processing is performed on a transparent product in which one of the surface (laser light incident surface) 11 and the back surface is formed to be transparent, and the other surface is formed into a frosted glass shape, and it was verified whether or not the management information 10 can be formed inside thereof, and whether or not said information can be read out.

In Example 2, natural fused quartz glass (GE 214 manufactured by Momentive) formed into a flat plate having an outer diameter $\phi_2$ of 50 mm and a plate thickness $t_2$ of 5 mm was used as a transparent product. Then, a sample product in which one side of the transparent product was made transparent, and the other side was roughened to form a frosted glass was provided. In this example, products respectively having a surface roughness of the frosted glass surface roughened into Ra 0.704 μm and Ra 3.270 μm were used, and each of them was processed with these two roughnesses on the surfaces and the back surfaces, i.e., products having total four different surface conditions were provided to use.

In the laser processing in this example, a YAG pulse laser similar to that in Example 1 was used, and the processing output was set to two different modes, i.e., 1.5 W and 9 W. By this laser processing, it was verified whether or not a square shaped QR code having one side of 13 mm can be formed at a depth of about 1.7 mm from the surface, and whether or not the information can be read out. Table 3 shown below shows the results.

TABLE 3

Internal laser marking/QR code to a flat plate
with different surface condition of each surface

| | Surface Finish of Quartz Glass Substrate | | | | |
|---|---|---|---|---|---|
| No. | Surface (Laser light incident surface) | Back surface | Laser Processing Output | Process-ability | Read-ability |
| 1 | Transparent (Mechanical polishing, Ra 0.02 μm) | Frosted glass (Ra 0.704 μm) | 1.5 W, 9 W | ○ | ○ |
| 2 | Transparent (Mechanical polishing, Ra 0.02 μm) | Frosted glass (Ra 3.270 μm) | 1.5 W, 9 W | ○ | ○ |
| 3 | Frosted glass (Ra 0.704 μm) | Transparent (Mechanical polishing, Ra 0.02 μm) | 1.5 W, 9 W | × | × |
| 4 | Frosted glass (Ra 3.270 μm) | Transparent (Mechanical polishing, Ra 0.02 μm) | 1.5 W, 9 W | × | × |

Figure 3:
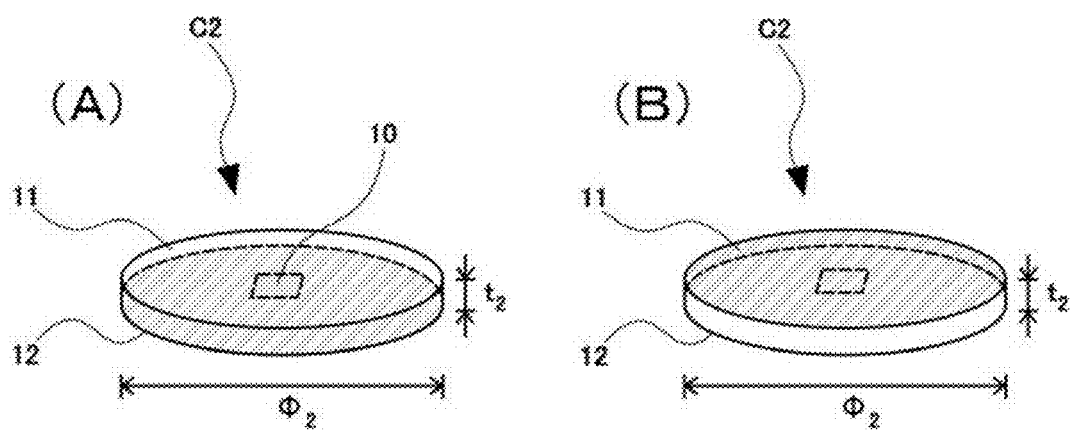
FIG. 3 shows perspective views of products provided with the management information according to Example 2: (A) a perspective view of a product formed with frosted glass on the back side; and (B) a perspective view of a product formed with frosted glass on the surface (laser light incident surface).

As shown in Table 3 (No. 1/2) and FIG. 3(A), to the transparent product C2 in which the surface (laser light incident surface) 11 is formed to be transparent and the back surface 12 is formed into frosted glass, the management information 10 can be formed by any of the laser processing outputs, and can be read out.

On the other hand, as shown in Table 3 (No. 3/4) and FIG. 3(B), to the transparent product C2 in which the surface (laser light incident surface) 11 is formed into a frosted glass shape and the back surface is formed to be transparent, the management information 10 could not be formed inside.

That is, it was confirmed that it is desirable to form the laser light incident surface transparently and smoothly in order to apply ablation processing by laser light to the inside of the product.

Example 3

In Example 3, laser processing was carried out on transparent products having different product shapes, and it was verified whether or not the management information 10 could be formed and read out. In particular, cylindrical transparent products with different cylindrical outer diameters were used.

Figure 4:
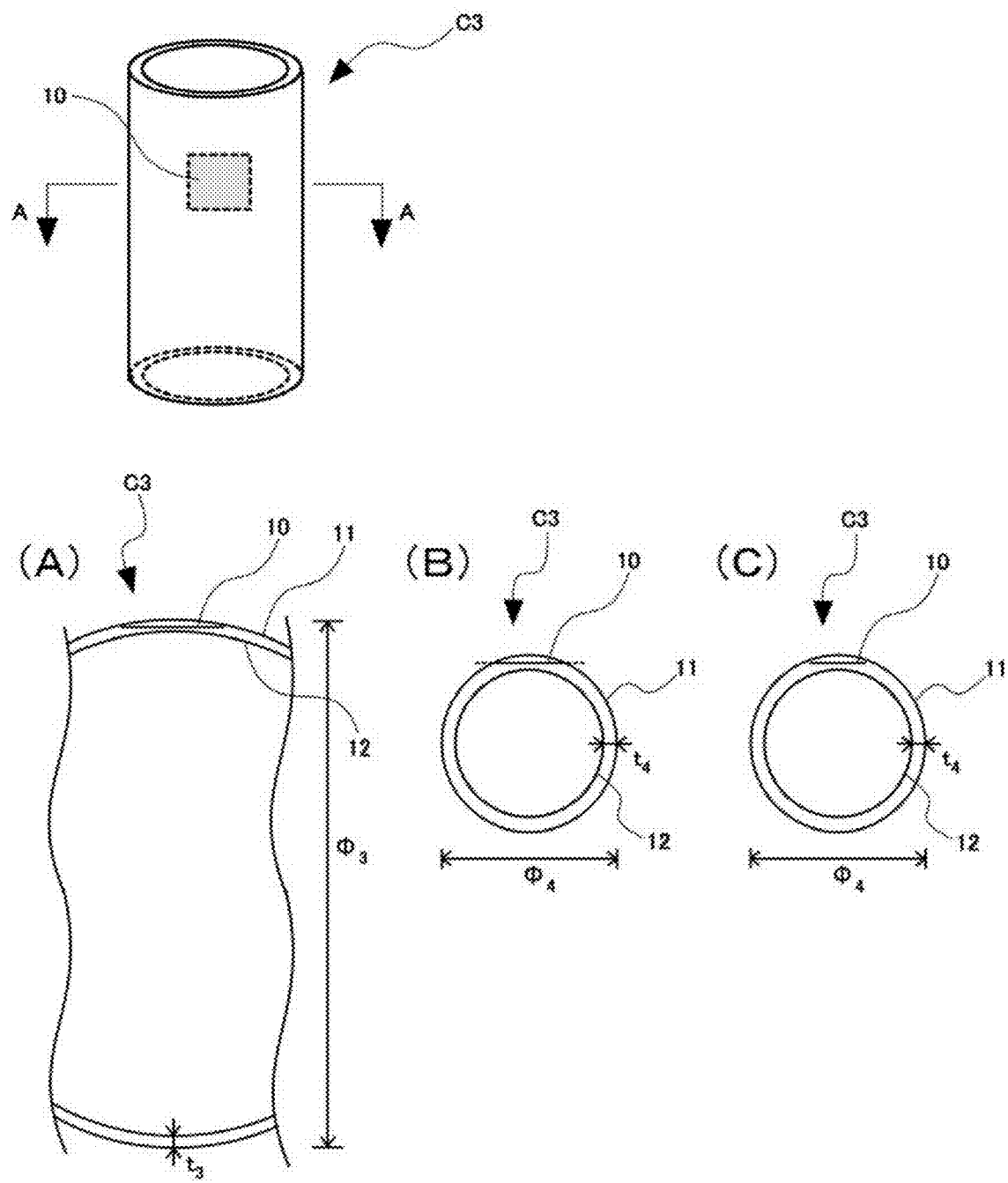
FIG. 4 shows perspective views of products provided with the management information according to Example 3: (A) an A-A longitudinal section schematic view, showing a state where the management information is indicated for a product of a large diameter pipe; (B) an A-A longitudinal section view, showing a state where the management information is indicated for a product of a small diameter pipe; and (C) an A-A longitudinal section view, showing a slate where the management information of small size is indicated for a product of a small diameter pipe.

In Example 3, a cylinder formed of natural fused quartz glass (GE 214 manufactured by Momentive) was used as a transparent product. As shown in FIG. 4, two different transparent products C3 were provided in which one is a large-diameter tube having an outer diameter $\phi_3$ of 280 mm and a plate thickness $t_3$ of 5 mm, and the other is a small diameter tube having an outer diameter $\phi_4$ of 26 mm and a plate thickness $t_4$ of 2 mm were used. In these two products, both the surfaces (laser light incident surfaces) 11 and the back surfaces 12 were formed to be transparent.

A YAG pulsed laser similar to those in Examples 1 and 2 was used for the laser processing, and the processing outputs were set to 5 different modes, 1.5 W, 3 W, 5 W, 7 W, and 9 W. By this laser processing, it was verified whether or not a square shaped QR code having one side of 13 mm or 6 mm can be formed at a depth of about 1.7 mm from the product surface, and whether or not the information can be read out. Table 4 shown below shows the results.

TABLE 4

Internal laser marking/QR code to Quartz glass cylindrical substrate (both inner and outer surfaces were applied with a transparent baked finish)

| No. | Cylinder Outer Diameter | QR Code Size | Laser Processing Output | Process- ability | Read- ability |
|---|---|---|---|---|---|
| 1 | Φ280 mm | □ 13 mm | 1.5 W, 3 W, 5 W, 7 W, 9 W | ○ | ○ |
| 2 | Φ26 mm | □ 13 mm | 1.5 W | Δ | × |
| 3 | Φ26 mm | □ 6 mm | 1.5 W, 3 W, 5 W, 7 W, 9 W | ○ | ○ |

Δ: Since the end of the code figure cannot be formed, it cannot be read out.

As shown in Table 4 (No. 1) and FIG. 4(A), to the transparent product C3 formed in a large diameter tube having an outer diameter $\phi_3$ of 280 mm, the management information 10 (QR code) in a square shape with one side of 13 mm could be formed by any of the laser processing outputs.

On the other hand, as shown in Table 4 (No. 2) and FIG. 4(B), to the transparent product. C3 formed in a small diameter tube having an outer diameter $\phi_4$ of 26 mm, the central part of the management information 10 (QR code) in the form of a square shape having one side of 13 mm could be formed, but the edge part thereof could not be formed. Since complete management information 10 was not formed, reading was also impossible.

However, as shown in Table 4 (No. 3) and FIG. 4(C), to the transparent product C3 formed in the small diameter tube, the management information 10 (QR code) having a square shape with one side of 6 mm could be formed inside.

From the above experimental results, it could be confirmed that when the transparent products C3 are formed in a cylindrical shape or the like, since the formation surface of the management information 10 is formed into a curved surface, it is necessary to adjust the formation region of the management information 10. By appropriately selecting and using the shape of the management information, for example, adjusting the size of the management information 10 depending on the shape of the transparent product, or forming the management information 10 in another shape with respect to the axial direction, it becomes possible to form the management information 10 reliably and accurately inside of the transparent product.

Example 4

Figure 5:
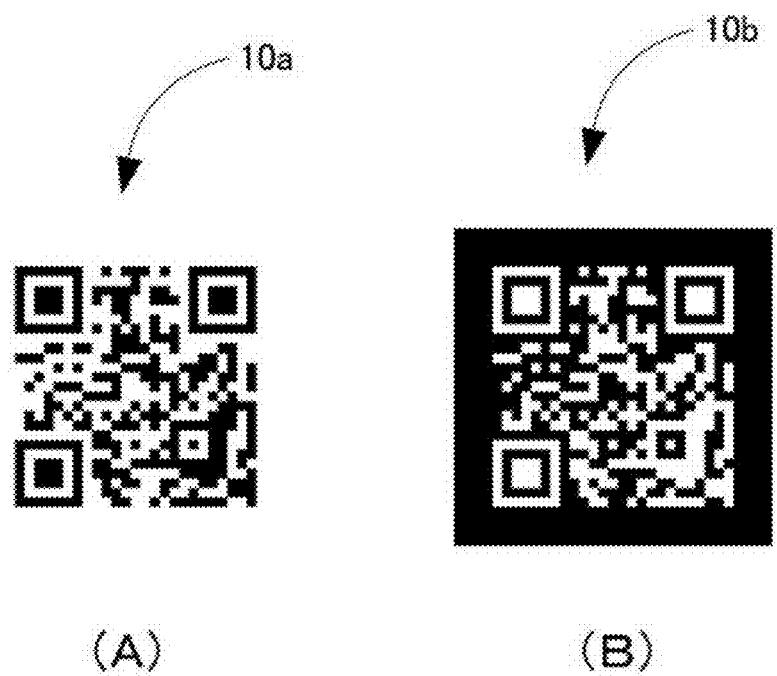
FIG. 5 shows front views each showing the management information according to Example 4.

In this example, when the management information is indicated by forming an opaque portion to a transparent product by ablation with laser light thereto, the "information indicating portion", which is normally indicated in black or the like, was rendered opaque to form a two-dimensional code 10a (FIG. 5(A)), and the margin portion was made opaque to form a transparent "information indicating portion" of a two-dimensional code 10b (FIG. 5(B)), and the differences therebetween in terms of the recognition rate when reading with a two-dimensional code reader were compared. As a result of reading by a two-dimensional code reader the two two-dimensional codes in which the patterns thereof were inverted each other, in a two-dimensional code in which an opaque portion is formed in the transparent product and the reflection rate of the light is made different, the reading performance by the two-dimensional code reader was deteriorated depending on the background appearing through the transparent portion. That is, depending on the reading environment of the reader, the reading accuracy was higher in the two-dimensional code 10b in which the margin portion was made opaque and the "information indicating portion" was made transparent. Therefore, it was confirmed that in order to improve the reading performance of the two-dimensional code reader, it is effective to form the management information such that the transparent portion is small when considering whether the "margin portion" or "information indicating portion" is made opaque. Also, it was confirmed that in order to improve the reading accuracy in any environment, it is effective to provide both the management information in which the "margin portion" is made opaque and the management information in which the "information indicating portion" is made opaque.

Example 5

In this example, the drawing composition of the cells constituting the management information was changed, and the difference in terms of the reading accuracy in the two-dimensional code reader was confirmed. That is, as shown in FIGS. 6(A) to 6(E), differences in terms of the reading accuracy by the two-dimensional code reader were compared by malting patterns different to be opaque by ablation processing.

Figure 6:
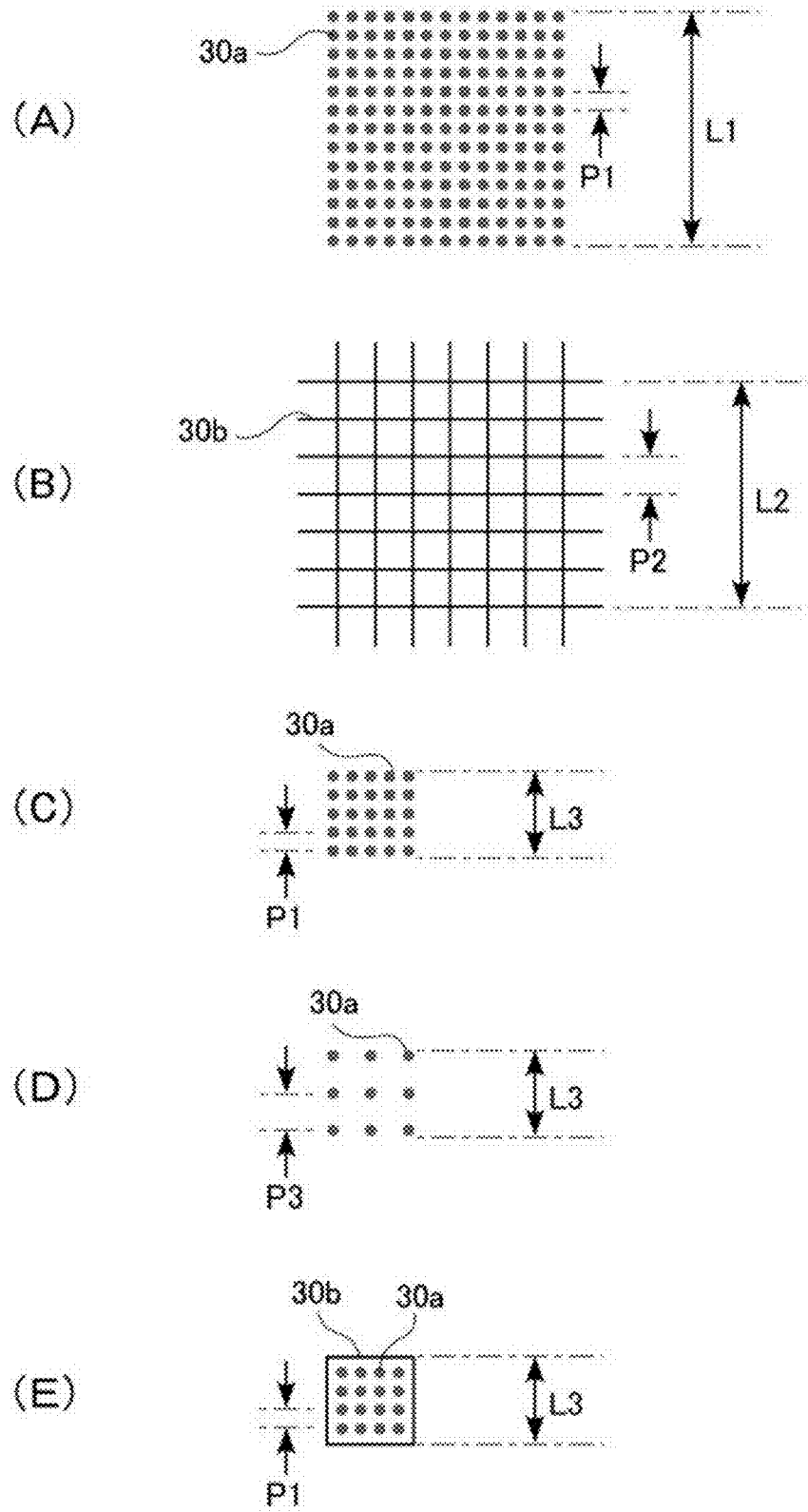
FIG. 6 shows enlarged front views each showing the management information cells according to Example 5.

In FIG. 6(A), one cell was a square (□) of a size L1 having a side of 500 μm, in which dots 30a, 13 dots vertically and 13 dots horizontally, were aligned to arrange within the cell, wherein the pitch P1 between every dots 30a within the cell was 40 μm. As a result, the reading accuracy by the two-dimensional code reader (hereinafter referred to as "reading accuracy") was 90% or above. On the other hand, when in the same cell, but the number of dots, 6 dots vertically, and 6 dots horizontally aligned, was used, the reading accuracy was 50% or less.

In FIG. 6(B), one cell was a square (□) of a size L2 having a side of 320 μm, in which lines 30b were crossed to form a cross hatch within the cell. Experiments were conducted with different pitches P2 of the lines 30b, i.e., 10 μm, 40 μm, 80 μm, and 120 μm, and found that the reading accuracy was 90% or above at any pitch. However, it was confirmed as the line pitch is made smaller, the reading accuracy also increases, but the processing time becomes longer.

In FIG. 6(C), one cell was a square (□) of a size L3 having a side of 200 μm, in which dots 30a, 5 dots vertically and 5 dots horizontally, were aligned to arrange within the cell, wherein the pitch P1 between every dots 30a within the cell was 40 μm. As a result, the reading accuracy was 90% or above. On the contrary, as shown in FIG. 6(D), when one cell was a square (□) of a size L3 having a side of 200 μm, similarly to the case as shown in FIG. 6(C), in which dots 30a, 3 dots vertically and 3 dots horizontally, were aligned to arrange within the cell, wherein the pitch P3 between every dots 30a within the cell was 80 μm, this could not hardly be read out by the two-dimensional code reader. As shown in FIG. 6(E), when one cell was a square (□) of a size L3 having a side of 200 μm, similarly to the case as shown in FIG. 6(C), in which dots 30a, 4 dots vertically and 4 dots horizontally, were aligned to arrange within the cell, wherein the pitch P1 between every dots 30a within the cell was 40 μm, and the outside of said cell was surrounded by line 30b, the reading accuracy was 90% or above. On the contrary, when one cell was of a size having a side of 200 μm, in which dots 30a, 4 dots vertically and 4 dots horizontally, were aligned to arrange within the cell, wherein the pitch between every dots 30a within the cell was 40 μm (without surrounding by the line), the reading accuracy was about 50%. From this, it could be confirmed that the reading accuracy can be improved even though fewer number of the dots aligned to arrange by surrounding a line of the periphery thereof (or the cell).

EXPLANATION OF SYMBOLS

C1, C2, C3 Transparent Product
10 Management information
11 Surface (Laser light incident surface)
12 Back surface
13 Collecting lens
20A, 20B, 20C Distinguishing Indication
L Laser light
P Focus point
φ Outer diameter
t Plate thickness
Z Distance

The invention claimed is:

1. A product provided with management information, characterized in that said management information is provided at a site where the product has a thickness, and inside thereof in the thickness direction, in which said management information can be visually recognized through at least one of the surfaces of said product in the thickness direction, wherein besides said management information, a distinguishing indication for discriminating at least one of a front side, a back side, and reversal of the management information to identify the correct position of said management information is provided.

2. The product according to claim 1, wherein said management information is formed by surrounding the aligned dots by a line.

3. The product according to claim 2, wherein said product providing with the management information is a quartz glass product, in which said management information is formed by ablation processing in which a laser light from a YAG pulse laser having a wavelength range of 1064 nm to 355 nm is emitted at the processing output of 0.9 W or more, which is set to focus on inside the product; and the inside of said product is subjected to sublimation and evaporation after formation of the product.

4. The product according to claim 1, wherein said product providing with the management information is a quartz glass product, in which said management information is formed by ablation processing in which laser light from a YAG pulse laser having a wavelength range of 1064 nm to 355 nm is emitted at the processing output of 0.9 W or more, which is set to focus on inside the product; and the inside of said product is subjected to sublimation and evaporation after formation of the product.

5. The product according to claim 1, wherein the management information is formed in parallel or substantially in parallel with the at least one of the surfaces of said product in the thickness direction.

6. A method for managing a product for maintenance thereof based on management information provided in said product, wherein:
    the product is a product according to claim 1; and
    the method comprises:
        reading out the management information provided to surfaces of the product having a thickness permeably through at least one of said surfaces in the thickness direction to acquire at least one of a maintenance period, a date of manufacture, and a manufacturer of said product.

7. A method for managing a product for maintenance thereof based on management information provided in said product, wherein:
    the product is a product according to claim 2; and
    the method comprises:
        reading out the management information provided to surfaces of the product having a thickness permeably through at least one of said surfaces in the thickness direction to acquire at least one of a maintenance period, a date of manufacture, and a manufacturer of said product.

* * * * *